(12) United States Patent
Feuerstein et al.

(10) Patent No.: US 11,754,443 B2
(45) Date of Patent: Sep. 12, 2023

(54) PHOTOCONDUCTOR READOUT CIRCUIT

(71) Applicant: TRINAMIX GMBH, Ludwigshafen am Rhein (DE)

(72) Inventors: Bertram Feuerstein, Ludwigshafen (DE); Robert Gust, Ludwigshafen (DE); Darren Richard Gould, Ludwigshafen (DE); Sebastian Valouch, Ludwigshafen (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 0 days.

(21) Appl. No.: 17/754,457

(22) PCT Filed: Oct. 8, 2020

(86) PCT No.: PCT/EP2020/078213
§ 371 (c)(1),
(2) Date: Apr. 1, 2022

(87) PCT Pub. No.: WO2021/069547
PCT Pub. Date: Apr. 15, 2021

(65) Prior Publication Data
US 2022/0397454 A1 Dec. 15, 2022

(30) Foreign Application Priority Data
Oct. 9, 2019 (EP) ..................................... 19202133

(51) Int. Cl.
*G01J 1/44* (2006.01)
*G01J 1/46* (2006.01)

(52) U.S. Cl.
CPC . *G01J 1/44* (2013.01); *G01J 1/46* (2013.01); *G01J 2001/448* (2013.01)

(58) Field of Classification Search
CPC .......... G01J 1/44; G01J 1/46; G01J 2001/448; G01J 3/2803; G01J 2001/444; G01J 5/22; G01J 1/4228; G01J 2001/4453
See application file for complete search history.

(56) References Cited

U.S. PATENT DOCUMENTS

| | | | | | |
|---|---|---|---|---|---|
| 3,495,515 | A | * | 2/1970 | Reimann | .................... G01J 1/44 250/206 |
| 3,510,834 | A | * | 5/1970 | Durand | ..................... G01S 1/02 340/972 |
| 6,310,346 | B1 | * | 10/2001 | Boreman | .................. G01J 5/34 250/338.4 |

FOREIGN PATENT DOCUMENTS

| | | |
|---|---|---|
| WO | 2012110924 A1 | 8/2012 |
| WO | 2014097181 A1 | 6/2014 |
| WO | 2016120392 A1 | 8/2016 |

OTHER PUBLICATIONS

"Use of GAAS High-Gain Photoconductors as New Detectors in Spectroscopic Systems", Electronics Letters, IEE Stevenage, GB, vol. 24, No. 3, Feb. 4, 1988 (Feb. 4, 1988), p. 141/142, XP000005772, ISSN: 0013-5194.

(Continued)

*Primary Examiner* — Tony Ko
(74) *Attorney, Agent, or Firm* — Armstrong Teasdale LLP

(57) ABSTRACT

Disclosed herein is a device including
at least one photoconductor configured for exhibiting an electrical resistance dependent on an illumination of a light-sensitive region of the photoconductor; and
at least one photoconductor readout circuit, where the photoconductor readout circuit includes at least one voltage divider circuit, where the voltage divider circuit includes at least one reference resistor Rref being arranged in series with the photoconductor, where the photoconductor readout circuit includes at least one (Continued)

amplifier device, where the photoconductor readout circuit includes at least one capacitor arranged between an input of the amplifier device and an output of the voltage divider circuit.

16 Claims, 4 Drawing Sheets

(56) References Cited

OTHER PUBLICATIONS

"Compound semiconductor photosensors", Hamamatsu, Chapter 6, available at <https://www.hamamatsu.com/resources/pdf/ssd/e06_handbook_compound_semiconductor.pdf>.
International Search Report and Written Opinion for corresponding PCT/EP2020/078213 dated Feb. 15, 2021; 9 pages.

* cited by examiner

PHOTOCONDUCTOR READOUT CIRCUIT

CROSS-REFERENCE TO RELATED APPLICATIONS

This application is a U.S. National Phase Application of International Patent Application No. PCT/EP2020/078213, filed Oct. 8, 2020, which claims priority to European Patent Application No. 19202133.5, filed Oct. 9, 2019, each of which is hereby incorporated by reference herein.

FIELD OF THE INVENTION

The invention relates to a device, a resistive transducer and use of a device for readout of photoconductors. Specifically, the device may be used to determine a measurable voltage response of photoconductors such as of lead sulfide photoconductors sensors.

PRIOR ART

Photoconductors such as lead sulfide photoconductors require a resistance measurement for readout. Photoconductors, especially lead sulfide photoconductors, show a strong dependence of the dark resistance to the illumination history of the photoconductor. Moreover, external parameters such as temperature, humidity and exposure to contaminants can change the dark resistance and signal resistance of photoconductors strongly in time. As a result the signal strength, determined as the change in resistance for a given illumination intensity, of the photoconductor is showing a strong drift behavior, which needs to be regularly compensated or minimized by limiting the exposure of the detector to external influences.

Voltage divider circuits are known for read out photoconductors. Usually a voltage amplifier together with a voltage divider is used, see for example https://www.hamamatsu.com/resources/pdf/ssd/e06_handbook_compound_semiconductor.pdf, to measure the signal from a photoconductor. However, this configuration may result in a strong drift of the signal with a change in dark resistance. Known operational amplifier circuit filter out the dark DC voltage. Dark resistance changes have little impact on DC filtering. The signal does drift, however, due to changes in the responsivity and detectivity with respect to environmental changes.

Spectrometers require sensors to detect electromagnetic absorption at different wavelengths in the electromagnetic spectrum. One approach is to use an array of sensors where each pixel in the array responds to electromagnetic energy of a different wavelength. Various types of photoresistive sensors, however, exhibit large dark currents. Photoconductors, for example, are generally biased with a direct current (DC) voltage which leads to a dark current flowing through the device. When an external electromagnetic illumination source illuminates the photosensitive region of the photoconductor, the photoconductors electrical resistance changes which in turn induces a changing current which is proportional to the modulated illumination source. The changing current is generally small in comparison to the dark current that is flowing through the sensor.

When such an array of sensors is used, each pixel must have associated circuitry which eliminates the dark current and amplifies the small changing current. Known circuitry accomplishes this task but the number of components scales linearly with the number of pixels.

The higher number of components lead to higher costs and complexity as well as larger printed circuit board (PCB) boards. In addition, resistors are sources of electrical noise, such as thermal or current noise, which impact the signal to noise ratio of the amplified changing current.

Thus, there is a need for reducing complexity of circuitry and for improving the signal-to-noise ratio, which is the determining factor for the quality of a sensor.

Problem Addressed by the Invention

Therefore, a problem addressed by the present invention is that of specifying a device and a resistive transducer which at least substantially avoid the disadvantages of known circuits of this type. In particular, an improved readout of a photoconductor, in particular independent of dark resistance, would be desirable.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used herein, the expressions "have", "comprise" and "contain" as well as grammatical variations thereof are used in a non-exclusive way. Thus, the expression "A has B" as well as the expression "A comprises B" or "A contains B" may both refer to the fact that, besides B, A contains one or more further components and/or constituents, and to the case in which, besides B, no other components, constituents or elements are present in A.

In a first aspect of the present invention, a device is disclosed. The device comprises:
- at least one photoconductor configured for exhibiting an electrical resistance dependent on an illumination of a light-sensitive region of the photoconductor;
- at least one photoconductor readout circuit, wherein the photoconductor readout circuit comprises at least one voltage divider circuit, wherein the voltage divider circuit comprises at least one reference resistor $R_{ref}$ being arranged in series with the photoconductor, wherein the photoconductor readout circuit comprises at least one amplifier device, wherein the photoconductor readout circuit comprises at least one capacitor arranged between an input of the amplifier device and an output of the voltage divider circuit.

The term "photoconductor", also denoted as photoresistor, as used herein is a broad term and is to be given its ordinary and customary meaning to a person of ordinary skill in the art and is not to be limited to a special or customized meaning. The term specifically may refer, without limitation, to a light sensitive element capable of exhibiting a specific electrical resistance $R_{photo}$ dependent on an illumination of the light-sensitive region the photoconductor. Specifically, the electrical resistance is dependent on the illumination of a material of the photoconductor. As will be outlined in detail below, the photoconductor may comprise a light-sensitive region comprising a "photoconductive material". A photoconductor can, for example, be applied in light-sensitive detector circuits. The device may comprise a plurality of photoconductors. The photoconductors may be arranged in an array. The photoconductors of the array may be designed identical, in particular with respect to size and/or shape of their light-sensitive regions and/or photoconductive materials.

The term "illumination" as used herein is a broad term and is to be given its ordinary and customary meaning to a person of ordinary skill in the art and is not to be limited to a special or customized meaning. The term specifically may refer, without limitation, to electromagnetic radiation in one or more of the visible spectral range, the ultraviolet spectral range and the infrared spectral range. Therein, in partial accordance with standard ISO-21348, the term visible spectral range generally refers to a spectral range of 380 nm to 760 nm. The term infrared (IR) spectral range generally refers to electromagnetic radiation in the range of 760 nm to 1000 µm, wherein the range of 760 nm to 1.4 µm is usually denominated as the near infrared (NIR) spectral range, and the range from 15 µm to 1000 µm as the far infrared (FIR) spectral range. The term "ultraviolet spectral range" generally refers to electromagnetic radiation in the range of 1 nm to 380 nm, preferably in the range of 100 nm to 380 nm. In the following, the term "illumination" is also denoted as "light". Preferably, illumination as used within the present invention is visible light, i.e. light in the visible spectral range, and/or infrared light, i.e. light in the infrared spectral range.

As used herein, the term "light-sensitive region of the photoconductor" generally refers to an area of the photoconductor being sensitive to an illumination, e.g. by an incident light beam. For example, the light-sensitive region may be a two-dimensional or three-dimensional region which preferably, but not necessarily, is continuous and can form a continuous region. The photoconductor can have one or else a plurality of such light-sensitive regions. As used herein, the term "to exhibit an electrical resistance dependent on an illumination" generally refers to that the electrical resistance of the photoconductor is adjusted and/or changed and/or varied dependent, on the illumination, in particular an intensity of the illumination, of the light-sensitive region. In particular, in response to the illumination, the electrical resistance is adjusted and/or changed and/or varied. When the photoconductor is illuminated the photoconductor may exhibit a decrease in electrical resistance. The photoconductor may lower its resistivity when illuminated. Specifically, the electrical resistance of the photoconductor may decrease with increasing incident light intensity. The change between dark resistance and bright resistance is the quantity to be measured or to be read out, and may be denoted as output current of the photoconductor. As used herein, the term "dark resistance" generally refers to an electrical resistance of the photoconductor in unlit state, i.e. without illumination. As further used herein, the term "bright resistance" refers to an electrical resistance of the photoconductor under illumination. For measuring and/or read out generally voltage divider circuits are known which have a non-linear behavior. A linear change in the resistance of the photoconductor leads to a non-linear change in the voltage output. Generally, there is a degree of non-linearity in the standard operational amplifier circuits that is mostly due to non-linearity of the photoconductor such as a PbS sensor. The circuit itself is relatively linear when designed properly. The circuit according to the present invention also behaves linearly when properly designed. The present invention, as will be outlined in more detail below, proposes circuit features having a linear behavior.

The photoconductor may comprise at least one photoconductive material. Since an electrical resistance is defined as the reciprocal value of the electrical conductivity, alternatively, the term "photoresistive material" may also be used to denominate the same kind of material. The light-sensitive region may comprise at least one photoconductive material selected from the group consisting of lead sulfide (PbS); lead selenide (PbSe); mercury cadmium telluride (HgCdTe); cadmium sulfide (CdS); cadmium selenide (CdSe); indium antimonide (InSb); indium arsenide (InAs); indium gallium arsenide (InGaAs); extrinsic semiconductors, e.g. doped Ge, Si, GaAs, organic semiconductors. However, other materials may be feasible. Further possible photoconductive materials are described in WO 2016/120392 A1, for example. For example, the photoconductor may be a photoconductor commercially available under the brand name Hertzstueck™ from trinamiX GmbH, D-67056 Ludwigshafen am Rhein, Germany.

For example, the light-sensitive region may be illuminated by at least one illumination source. The illumination source can for example be or comprise an ambient light source and/or may be or may comprise an artificial illumination source. By way of example, the illumination source may comprise at least one infrared emitter and/or at least one emitter for visible light and/or at least one emitter for ultraviolet light. By way of example, the illumination source may comprise at least one light emitting diode and/or at least one laser diode. The illumination source can comprise in particular one or a plurality of the following illumination sources: a laser, in particular a laser diode, although in principle, alternatively or additionally, other types of lasers can also be used; a light emitting diode; an incandescent lamp; a neon light; a flame source; an organic light source, in particular an organic light emitting diode; a structured light source. Alternatively or additionally, other illumination sources can also be used. The illumination source generally may be adapted to emit light in at least one of: the ultraviolet spectral range, the infrared spectral range. Most preferably, at least one illumination source is adapted to emit light in the NIR and IR range, preferably in the range of 800 nm and 5000 nm, most preferably in the range of 1000 nm and 4000 nm.

The illumination source may comprise at least one non-continuous light source. Alternatively, the illumination source may comprise at least one continuous light source. The light source may be an arbitrary light source having at least one radiating wavelength having an overlap to the sensitive wavelength of the photoconductor. For example, the light source may be configured for generating a Planckian radiation. For example, the light source may comprise at least one light emitting diode (LED) and/or at least one Laser source. For example, the light source may be configured for generating illumination by an exotherm reaction, like an oxidation of liquid or solid-material or Gas. For example, the light source may be configured for generating illumination out of fluorescent effects. The illumination source may be configured for generating at least one modulated light beam. Alternatively, the light beam generated by the illumination source may be non-modulated and/or may be modulated by further optical means. The illumination source may comprise at least one optical chopper device configured for modulating a light beam from the continuous light source. The optical chopper device may be configured for periodically interrupting the light beam from the continuous light source. For example, the optical chopper device may be or may comprise at least one variable frequency rotating disc chopper and/or at least one fixed frequency tuning fork chopper and/or at least one optical shutter. Due to the non-continuous illumination the output current may be a changing current signal, also denoted modulation current. The modulated current may be small comparted to dark current of the photoconductor.

The term "photoconductor readout circuit" as used herein is a broad term and is to be given its ordinary and customary meaning to a person of ordinary skill in the art and is not to be limited to a special or customized meaning. The term specifically may refer, without limitation, to an electronic circuit configured for readout of at least one photoconductor and/or a plurality of photoconductors.

The photoconductor readout circuit comprises the at least one voltage divider circuit. The term "voltage divider circuit", also denoted as potential divider, as used herein is a broad term and is to be given its ordinary and customary meaning to a person of ordinary skill in the art and is not to be limited to a special or customized meaning. The term specifically may refer, without limitation, to an electronic circuit which is configured for generating an output voltage signal which is a fraction of an input voltage signal of the voltage divider circuit.

The voltage divider circuit comprises the at least one reference resistor $R_{ref}$ being arranged in series with the photoconductor. The term "reference resistor" as used herein is a broad term and is to be given its ordinary and customary meaning to a person of ordinary skill in the art and is not to be limited to a special or customized meaning. The term specifically may refer, without limitation, to a resistor having a known electrical resistance $R_{ref}$. The reference resistor may be an arbitrary resistor adapted to allow determining voltage changes. The reference resistor may be configured to allow determining and/or measuring the resistance $R_{photo}$ of the photoconductor. The reference resistor is arranged in series with the photoconductor.

The photoconductor may have a dark resistance $R_{dark}$. As used herein, the term "dark resistance" generally refers to an electrical resistance of the photoconductor in unlit state, i.e. without illumination. A ratio of the resistance of the reference resistor and the dark resistance $R_{ref}/R_{dark}$ may be $0.01 \leq R_{ref}/R_{dark} \leq 10$. Preferably, the ratio $R_{ref}/R_{dark}$ may be around 0.1. The dark resistance of the photoconductor may be $50\Omega \leq R_{dark} \leq 500$ MΩ. At room temperature the dark resistance may be $50\Omega \leq R_{dark} \leq 50$ MΩ. At lower temperatures the dark resistance maybe higher, such as about 10 times higher at −40° C. For example, the dark resistance of the array of photoconductors may be 10 MΩ. The reference resistor may be adjustable. The resistance value of the reference resistor may be manually and/or automatically adjustable. In particular, the reference resistor may be adjustable with respect to the voltage input signal and photoconductor characteristics, for example a noise index.

The reference resistor may be a dark photoconductor. The term "dark photoconductor" as used herein is a broad term and is to be given its ordinary and customary meaning to a person of ordinary skill in the art and is not to be limited to a special or customized meaning. The term specifically may refer, without limitation, to a photoconductor in unlit state, i.e. without illumination. The photoconductor and the dark photoconductor may be designed identical or different from each other. Specifically, the dark photoconductor may be a dark PbS-sensor. For example, the reference resistor may comprise a photoconductor covered with at least one opaque mask, wherein the opaque mask prevents that light can pass to the light-sensitive region of the covered photoconductor. As outlined above, the device may comprise a plurality of photoconductors arranged in an array. For each illuminated pixel a dark pixel may be employed as reference resistor. To adjust, in particular to optimize, the dark resistance the size of the dark pixel may be adapted. For example, in a manufacturing process, all pixels may be coated with the same material, therefore, changing the pixel size may be the easiest way to adapt the pixel resistance.

The photoconductor readout circuit may comprises at least one bias voltage source configured for applying at least one bias voltage $U_{bias}$ to the photoconductor. The photoconductor may be electrically connected with the bias voltage source. As used herein, the term "bias voltage source" refers to at last one voltage source configured for generating the bias voltage. The bias voltage may be the voltage applied across the photoconductor material. The bias voltage may be a direct current (DC) voltage. The bias voltage $U_{bias}$ is 0.001 V≥$U_{bias}$≤5000 V, preferably 1 V≥$U_{bias}$≤500 V, most preferably 2 V≥$U_{bias}$≤50 V. The photoconductor may be electrically connected with the reference resistor, as outlined above, arranged in series. The reference resistor may be grounded. When the photoconductor is illuminated the photoconductor may exhibit a decrease in electrical resistance. The current having passed the photoconductor may pass through the reference resistor which may generate the output signal $U_c$ which depends on the electrical resistance $R_{photo}$ of the photoconductor. The use of the dark photoconductor as reference resistor may allow eliminating the strong dependency of the output signal on the photoconductors dark resistance. Moreover, the use of the dark photoconductor as reference resistor may incorporate a temperature compensation concerning temperature dependence of the photoconductor. However, the voltage $U_\alpha$ of the still is composed by more than 99% out of $U_{bias}/2$ such that the signal of interest, introduced by the illumination of the light-sensitive region of the photoconductor is less than 1%.

The photoconductor readout circuit comprises the at least one capacitor, denoted as capacitor $C_b$ in the following. The capacitor may have a capacity from 0.05 to 500 nF. Capacity of the capacitor $C_b$ may be, for example, 10 nF. The capacitor $C_b$ is arranged between the input of the amplifier device and an output of the voltage divider circuit. The term "capacitor" as used herein is a broad term and is to be given its ordinary and customary meaning to a person of ordinary skill in the art and is not to be limited to a special or customized meaning. The term specifically may refer, without limitation, to at least one element configured for collecting and/storing electrical energy, in particular originating from an output of the voltage divider circuit. The capacitor may be a filtering capacitor. The capacitor $C_b$ may be configured for blocking a dark current of the photoconductor. Specifically, the capacitor $C_b$ may be configured for filtering a dark DC current out of the output signal of the voltage divider circuit. The capacitor $C_b$ is configured for filtering for an alternating current (AC) signal component. The capacitor may be configured for letting the AC signal component pass. The AC signal component may have no direct current (DC) component. The AC signal component may consist only of the signal of interest. In known photoconductor readout circuits, capacitors are used differently as proposed in the present invention. E.g. in a known voltage amplifier the capacitor is used as RC-high pass filter to remove the DC content and to amplify the AC content. Moreover, the filter requires further components such as CHP and RHP. For example, non-inverting amplifier circuit that is generally used in known circuits, includes at least one photoconductor, one reference resistor, one filter capacitor and one filter resistor. In contrast, the present invention uses the capacitor $C_b$ as high pass filter, but in addition the AC current is provided to the amplifier device. The charge amplifier and transimpedance amplifier according to the present invention have one less resistor in comparison. The photoconductor, reference resistor and capacitor form the filter such that less components are required. In addition, the generally used non-inverting amplifier has two resistors for the amplification in the non-inverting input. The charge amplifier and the transimpedance amplifier according to the present invention only has one component. Thus, the charge amplifier and the transimpedance amplifier according to the present invention have less components in comparison to prior art. Moreover, since often arrays of photoconductors are used with potentially hundreds of sensors, the reduction of components is very advantageous.

The photoconductor readout circuit comprises at least one amplifier device. The term "amplifier device" as used herein is a broad term and is to be given its ordinary and customary meaning to a person of ordinary skill in the art and is not to be limited to a special or customized meaning. The term specifically may refer, without limitation, to at least one electronic device configured for charge or current amplification. The amplifier device may be configured for amplifying at least one output signal of voltage divider circuit, in particular the AC signal component $U_{\alpha,AC}$ having passed the capacitor. The amplifier device may be at least one charge amplifier or at least one transimpedance amplifier. The term "charge amplifier" as used herein is a broad term and is to be given its ordinary and customary meaning to a person of ordinary skill in the art and is not to be limited to a special or customized meaning. The term specifically may refer, without limitation, to an electronic device configured as integrator with high input impedances. The charge amplifier may be configured to convert charge into voltage. The high input impedances may prevent leakage loss. The charge amplifier may comprise an operational amplifier. The charge amplifier may comprise at least one capacitor $C_F$ in a feedback path. The capacitor in the feedback path may be configured for accumulating current over time. The term "transimpedance amplifier" as used herein is a broad term and is to be given its ordinary and customary meaning to a person of ordinary skill in the art and is not to be limited to a special or customized meaning. The term specifically may refer, without limitation, to an electronic device comprising at least one operational amplifier and a resistor in the feedback path. The transimpedance amplifier may be configured for multiplying an input current with the resistance $R_F$ of the resistor in the feedback path. The transimpedance amplifier may be configured for increasing the input and for converting the input current into voltage.

Charge amplifiers and transimpedance amplifiers are well known circuits used to measure charge and current. A direct connection of the photoconductor to the charge amplifier or transimpedance amplifier is not feasible due to large dark current of the photoconductor. The amplifiers dynamic range would be severely limited due to the small ratio of output current of the photoconductor to dark current. As a result, these circuits have not been explored for the use with photoconductors. The photoconductor readout circuit according to the present invention allows that charge amplifiers and transimpedance amplifiers can be used with sensors, in particular photoconductors, that exhibit large dark currents. The capacitor, as outlined above, may be placed between the amplifiers input and the voltage divider output. The capacitor may serve to block the dark current and shunt the small output current of the photoconductor to the amplifier device.

Without wishing to be bound by theory, an output voltage $v_o$ of the charge amplifier or transimpedance amplifier may be determined as follows. With the capacitor, the charge amplifier and the transimpedance amplifier may be regarded as voltage devices and a Fourier steady state is assumed. A transfer function of the charge amplifier may be $$\left|\frac{\Delta v_o}{v_a}\right| = \tau\omega\frac{C_b}{C_F},$$

wherein $v_a$ is an input voltage of the charge amplifier, $\tau$ is the integration time of the charge amplifier and $\omega$ is the modulation frequency of the illumination. Similarly, the relationship between the output voltage $v_o$ of the transimpedance amplifier and the input voltage $v_a$ of the transimpedance amplifier can be determined by $$\left|\frac{\Delta v_o}{v_a}\right| = \omega\frac{C_b}{R_F}.$$

The photoconductor readout circuit may comprise at least one diode arranged between the capacitor $C_B$ and the amplifier device. The diode may be configured as a protective diode that protects amplification from voltage peaks. A cathode of the diode may be connected to ground and an anode with the capacitor $C_B$. The diode may be configured for conducting current to ground and to protect current flow in the other direction. The use of a diode may significantly accelerate the transient oscillation time at start up. The diode may be or may comprise a TVS diode. The diode may be configured for suppressing transient voltages. The diode may be designed such that it does not functionally impact the circuit. The diode may be used to protect the circuit from damage in the event of a transient voltage. The protection diode, such as a TVS ESD diode, is generally either a part of the read-out integrated circuit or a separate diode included for extra protection. Other diode types or protection circuits are possible. In particular. other mechanisms to protect the input are possible.

As outlined above, the device may comprise a plurality of photoconductors such as arranged in an array. The photoconductor readout circuit may be configured for determining electrical resistance of each photoconductor of the plurality of photoconductors. The device may comprise at least one sample and hold circuit and at least one multiplexer. The term "sample and hold circuit" as used herein is a broad term and is to be given its ordinary and customary meaning to a person of ordinary skill in the art and is not to be limited to a special or customized meaning. The term specifically may refer, without limitation, to an electronic device configured for sampling voltage and for holding the value of the voltage at a constant level for a certain time period. The sample and hold circuit may comprise at least one capacitor configured for storing electric charge. The sample and hold circuit may comprise a switch in parallel to the amplifier device in order to discharge the circuit. If the switch is closed, the capacitor may be charged over the amplifier device. When opening the switch, the capacitor may hold the voltage at a constant value which was present before opening of the switch. In principle it may be possible to perform the discharge via a resistor in parallel to the protective diode. However, the discharge via the sample and hold circuit may be much faster than through a resistor.

The device may further comprise at least one analog-to-digital converter (ADC) configured to converts an output signal of the photoconductor readout circuit into a digital signal, specifically for further evaluation. In case of the device comprises a plurality of photoconductors and corresponding reference resistors, the device may comprise for each pair of photoconductors and corresponding reference resistors at least one ADC. However, other arrangements are feasible.

The device may comprise at least one read-out integrated circuit (ROIC). The photoconductor readout circuit may be designed as at least one integrated circuit. The reference resistor $R_{ref}$ and the capacitor GB may not form part of the ROIC due to space constraints. In particular, large capacitors and resistors require a large area in the integrated circuit and may be prohibitively expensive. The ROIC may comprise specific technology blocks like the ADC, multiplexer, sample and hold circuit. The sample and hold circuit and multiplexer may be part of the ROIC architecture. Many different architectures are possible, some without sample and hold circuit and/or multiplexer, ADC, etc. The ROIC may comprise means for the dark signal cancellation, in particular filtering, and an amplification stage as well as means to access the output signal of each input. The integrated circuit may comprise the amplifier device and/or the sample and hold circuit and/or the multiplexer. The integrated circuit may furthermore comprise the diode. The integrated circuit may furthermore comprise the at least one ADC. The term "integrated circuit" as used herein is a broad term and is to be given its ordinary and customary meaning to a person of ordinary skill in the art and is not to be limited to a special or customized meaning. The term specifically may refer, without limitation, to an electronic circuit on a substrate such as a semiconductor substrate. For example, the integrated circuit may be embodied as a microchip.

The device may comprise at least one logic gate such as a programmable logic, e.g. at least one Field Programmable Gate Array (FPGA).

In a further aspect of the present invention, a resistive transducer comprising at least one device according to the present invention is disclosed. The resistive transducer furthermore comprises at least one evaluation device adapted to determine a voltage output signal at at least one voltage output of the photoconductor readout circuit.

As used herein, the term "evaluation device" generally refers to an arbitrary device designed to determine and/or generating at least one voltage output signal at the voltage output. As an example, the evaluation device may be or may comprise one or more integrated circuits, such as one or more application-specific integrated circuits (ASICs), and/or one or more data processing devices, such as one or more computers, preferably one or more microcomputers and/or microcontrollers. Additional components may be comprised, such as one or more preprocessing devices and/or data acquisition devices, such as one or more devices for receiving and/or preprocessing of the voltage signal, such as one or more AD-converters and/or one or more filters. Further, the evaluation device may comprise one or more data storage devices. Further, as outlined above, the evaluation device may comprise one or more interfaces, such as one or more wireless interfaces and/or one or more wire-bound interfaces.

The evaluation device may particularly comprise at least one data processing device, in particular an electronic data processing device, which can be designed to determine at least one output voltage signal. The evaluation device can also be designed to completely or partly control the at least one illumination source and/or to control the at least one voltage source and/or to adjust the at least one load resistor. The evaluation device may further comprise one or more additional components, such as one or more electronic hardware components and/or one or more software components, such as one or more measurement units and/or one or more evaluation units and/or one or more controlling units.

The resistive transducer may comprise at least one illumination source such as at least one illumination source described with respect to the device above.

For further details concerning this aspect of the present invention reference may be made to the description of the device as described above and in more detail below.

In a further aspect of the present invention, a use of a device according to the present invention is disclosed for a purpose of readout of one or more of at least one PbS sensor, at least one PbSe sensor, or at least one pixelated sensor array comprising a plurality of pixels, wherein each of the pixels comprises at least one PbS or PbSe sensor. In particular, the device according to the present invention may be used in modest or low bias voltage applications, for example in applications where devices are battery operated or need to run on low power e.g. sensor nodes, portable measurement devices, devices in explosive atmospheres, allowing an improved signal-to-noise ratio and thus high signal quality. For example, the device may be used in spectrometers, moisture measurement instruments, thickness measurement instruments, gas analysis instruments or any other type of equipment using photoconductors as sensor element. The device may be used in optical sensors. For example, the device may be used in optical sensors which employ the so-called FiP effect, for example WO 2012/110924 A1, WO 2014/097181 A1 and WO 2016/120392 A1.

As described above, known readout circuits for readout of photoconductors rely upon voltage amplification of the high-pass filtered signal voltage. The present invention uses a different approach which blocks the dark current and uses a charge amplifier or transimpedance amplifier to amplify the modulated current. The main advantages to this approach are twofold. Firstly, the number of components is significantly smaller compared to prior art. Secondly, commercially available ROICs allow for software controlled analog signal gain. The number of resistors is reduced compared to prior art from 4 to 1. As well, highly integrated, commercially available read-out integrated circuits (ROICs) are available for multi-pixel solutions which integrate multiple operational amplifiers and the feedback resistor or capacitor. In addition, these ROICs integrate ADCs and other functionality. For these reasons, this type of solution allows multi-pixel read-out circuitry with less cost, smaller component count and higher density. The reduction of external capacitors and resistors also eliminate sources of noise, which improves the signal to noise ratio for the measurement. The ROICs generally allow gain adjustment via software which enables software control of the dynamic range. This means that the amplified output voltage can be adjusted when weaker or stronger electromagnetic modulation signals are present.

Summarizing, in the context of the present invention, the following embodiments are regarded as particularly preferred:

Embodiment 1: A device comprising
at least one photoconductor configured for exhibiting an electrical resistance dependent on an illumination of a light-sensitive region of the photoconductor;
at least one photoconductor readout circuit, wherein the photoconductor readout circuit comprises at least one voltage divider circuit, wherein the voltage divider circuit comprises at least one reference resistor $R_{ref}$ being arranged in series with the photoconductor, wherein the photoconductor readout circuit comprises at least one amplifier device, wherein the photoconductor readout circuit comprises at least one capacitor arranged between an input of the amplifier device and an output of the voltage divider circuit.

Embodiment 2: The device according to the preceding embodiment, wherein the amplifier device is at least one charge amplifier or at least one transimpedance amplifier.

Embodiment 3: The device according to any one of the preceding embodiments, wherein the amplifier device is configured for amplifying at least one output signal of voltage divider circuit.

Embodiment 4: The device according to any one of the preceding embodiments, wherein the capacitor is configured for blocking a dark current of the photoconductor, wherein the capacitor is configured for filtering a dark DC current out of the at least one output signal of the voltage divider circuit.

Embodiment 5: The device according to any one of the preceding embodiments, wherein the reference resistor is a dark photoconductor.

Embodiment 6: The device according to any one of the preceding embodiments, wherein the photoconductor has a dark resistance $R_{dark}$, wherein a ratio of the resistance of the reference resistor and the dark resistance $R_{ref}/R_{dark}$ is $0.01 \leq R_{ref}/R_{dark} \leq 10$.

Embodiment 7: The device according to the preceding embodiment, wherein the dark resistance of the photoconductor is $50\Omega \leq R_{dark} \leq 500$ M$\Omega$.

Embodiment 8: The voltage divider circuit according to any one of the preceding embodiments, wherein the reference resistor is adjustable.

Embodiment 9: The device according to any one of the preceding embodiments, wherein the photoconductor readout circuit comprises at least one diode arranged between the capacitor and the amplifier device.

Embodiment 10: The device according to any one of the three preceding embodiments, wherein the device comprises at least one read-out integrated circuit.

Embodiment 11: The device according to any one of the preceding embodiments, wherein the photoconductor readout circuit comprises at least one bias voltage source configured for applying at least one bias voltage to the photoconductor.

Embodiment 12: The device according to the preceding embodiment, wherein the bias voltage $U_{bias}$ is $0.001$ V$\geq U_{bias} \leq 5000$ V, preferably 1 V$\geq U_{bias} \leq 500$ V, most preferably 2 V$\geq U_{bias} \leq 50$ V.

Embodiment 13: The device according to any one of the preceding embodiments, wherein the device comprises a plurality of photoconductors, wherein the photoconductors are arranged in an array.

Embodiment 14: The device according to the preceding embodiment, wherein the photoconductor readout circuit is configured for determining electrical resistance of each photoconductor of the plurality of photoconductors, wherein the device comprises at least one sample and hold circuit and at least one multiplexer.

Embodiment 15: The device according to any one of the preceding embodiments, wherein the light-sensitive region comprises at least one photoconductive material selected from the group consisting of lead sulfide (PbS); lead selenide (PbSe); mercury cadmium telluride (HgCdTe); cadmium sulfide (CdS); cadmium selenide (CdSe); indium antimonide (InSb); indium arsenide (InAs); indium gallium arsenide (InGaAs); extrinsic semiconductors, organic semiconductors.

Embodiment 16: A resistive transducer comprising at least one device according to any one of the preceding embodiments, wherein the resistive transducer comprises at least one evaluation device configured for determining an output signal at at least one voltage output of the photoconductor readout circuit.

Embodiment 17: Use of a device according to any one of the preceding embodiments referring to a device, for readout of one or more of at least one PbS sensor, at least one PbSe sensor, or at least one pixelated sensor array comprising a plurality of pixels, wherein each of the pixels comprises at least one PbS or PbSe sensor.

BRIEF DESCRIPTION OF THE FIGURES

Further optional details and features of the invention are evident from the description of preferred exemplary embodiments which follows in conjunction with the dependent claims. In this context, the particular features may be implemented alone or with features in combination.

The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures:

FIG. 1 shows an exemplary embodiment of a device according to the present invention;

FIG. 2 shows a further exemplary embodiment of the device;

FIG. 3 shows an exemplary embodiment of a resistive transducer according to the present invention;

FIG. 4 shows a further exemplary embodiment of the resistive transducer;

FIGS. 5A and 5B show experimental results of amplified output voltages in response to a modulated electromagnetic signal of known intensity; and FIG. 6 shows experimental results of output voltage response of an ROIC to a photoconductor array.

EXEMPLARY EMBODIMENTS

Figure 1:
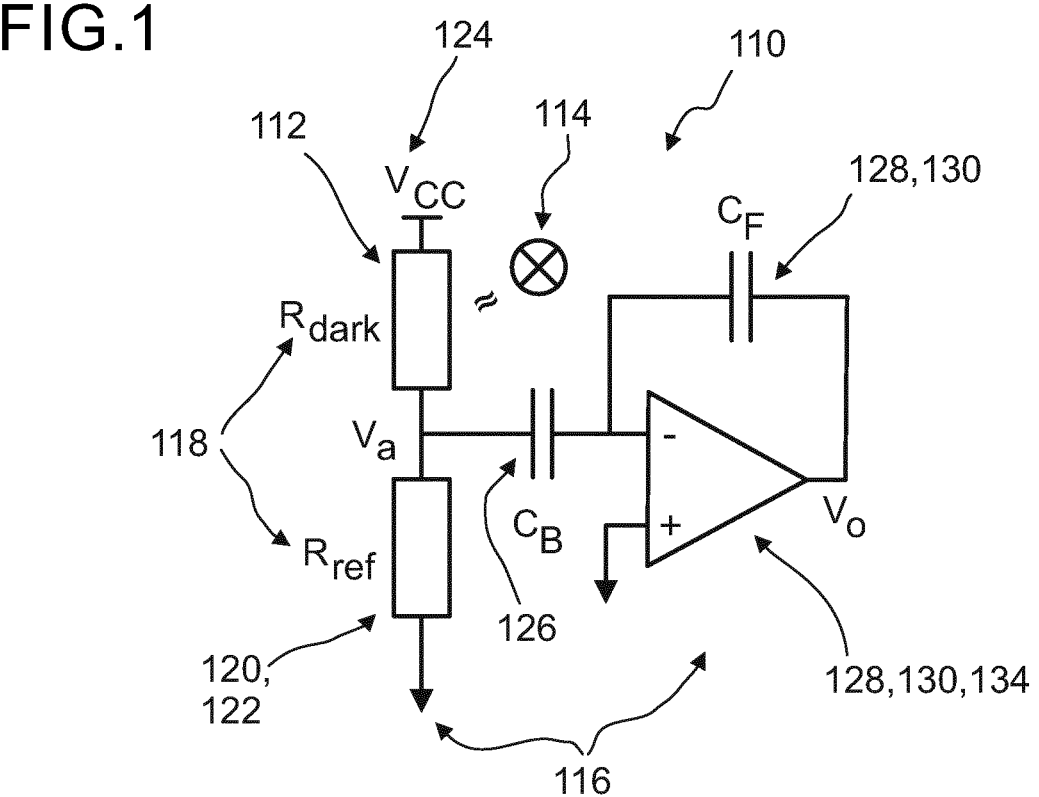

FIG. 1 illustrates, in a highly schematic fashion, an exemplary embodiment of a device 110. The device 110 comprises at least one photoconductor 112 configured for exhibiting an electrical resistance dependent on an illumination of a light-sensitive region of the photoconductor 112. The photoconductor 112 may be light sensitive element capable of exhibiting a specific electrical resistance $R_{photo}$ dependent on an illumination of the light-sensitive region the photoconductor 112. Specifically, the electrical resistance is dependent on the illumination of a material of the photoconductor 112. The photoconductor 112 may comprise a light-sensitive region comprising a photoconductive material. The light-sensitive region may comprise at least one photoconductive material selected from the group consisting of lead sulfide (PbS); lead selenide (PbSe); mercury cadmium telluride (HgCdTe); cadmium sulfide (CdS); cadmium selenide (CdSe); indium antimonide (InSb); indium arsenide (InAs); indium gallium arsenide (InGaAs); extrinsic semiconductors, e.g. doped Ge, Si, GaAs. However, other materials may be feasible. Further possible photoconductive materials are described in WO 2016/120392 A1, for example. For example, the photoconductor 112 may be a photoconductor commercially available under the brand name Hertzstueck™ from trinamiX GmbH, D-67056 Ludwigshafen am Rhein, Germany. A photoconductor 112 can, for example, be applied in light-sensitive detector circuits. The device 110 may comprise a plurality of photoconductors 112. The photoconductors may be arranged in an array. The photoconductors 112 of the array may be designed identical, in particular with respect to size and/or shape of their light-sensitive regions and/or photoconductive materials.

For example, the light-sensitive region may be illuminated by at least one illumination source 114. The illumination source 114 can for example be or comprise an ambient light source and/or may be or may comprise an artificial illumination source. By way of example, the illumination source 114 may comprise at least one infrared emitter and/or at least one emitter for visible light and/or at least one emitter for ultraviolet light. By way of example, the illumination source 114 may comprise at least one light emitting diode and/or at least one laser diode. The illumination source 114 can comprise in particular one or a plurality of the following illumination sources: a laser, in particular a laser diode, although in principle, alternatively or additionally, other types of lasers can also be used; a light emitting diode; an incandescent lamp; a neon light; a flame source; an organic light source, in particular an organic light emitting diode; a structured light source. Alternatively or additionally, other illumination sources can also be used. The illumination source 114 generally may be adapted to emit light in at least one of: the ultraviolet spectral range, the infrared spectral range. Most preferably, at least one illumination source is adapted to emit light in the NIR and IR range, preferably in the range of 800 nm and 5000 nm, most preferably in the range of 1000 nm and 4000 nm.

The illumination source 114 may comprise at least one non-continuous light source. Alternatively, the illumination source 114 may comprise at least one continuous light source. The light source may be an arbitrary light source having at least one radiating wavelength having an overlap to the sensitive wavelength of the photoconductor 112. For example, the light source may be configured for generating a Planckian radiation. For example, the light source may comprise at least one light emitting diode (LED) and/or at least one Laser source. For example, the light source may be configured for generating illumination by an exotherm reaction, like an oxidation of liquid or solid-material or Gas. For example, the light source may be configured for generating illumination out of fluorescent effects. The illumination source 114 may be configured for generating at least one modulated light beam. Alternatively, the light beam generated by the illumination source may be non-modulated and/or may be modulated by further optical means. The illumination source 114 may comprise at least one optical chopper device configured for modulating a light beam from the continuous light source. The optical chopper device may be configured for periodically interrupting the light beam from the continuous light source. For example, the optical chopper device may be or may comprise at least one variable frequency rotating disc chopper and/or at least one fixed frequency tuning fork chopper and/or at least one optical shutter. Due to the non-continuous illumination the output current may be a changing current signal, also denoted modulation current. The modulated current may be small comparted to dark current of the photoconductor 112.

For example, the light-sensitive region may be a two-dimensional or three-dimensional region which preferably, but not necessarily, is continuous and can form a continuous region. The photoconductor 112 can have one or else a plurality of such light-sensitive regions. In response to the illumination, the electrical resistance of the photoconductor 112 is adjusted and/or changed and/or varied. When the photoconductor 112 is illuminated the photoconductor 112 may exhibit a decrease in electrical resistance. The photoconductor 112 may lower its resistivity when illuminated. Specifically, the electrical resistance of the photoconductor 112 may decrease with increasing incident light intensity. The change between dark resistance and bright resistance is the quantity to be measured or to be read out, and may be denoted as output current of the photoconductor.

The device 110 comprises at least one photoconductor readout circuit 116. The photoconductor readout circuit 116 comprises at least one voltage divider circuit 118. The voltage divider circuit 118 comprises at least one reference resistor 120 being arranged in series with the photoconductor 112. The reference resistor 120 may be a resistor having a known electrical resistance $R_{ref}$. The reference resistor 120 may be an arbitrary resistor adapted to allow determining voltage changes. The reference resistor 120 may be configured to allow determining and/or measuring the resistance $R_{photo}$ of the photoconductor 112.

The photoconductor 112 may have a dark resistance $R_{dark}$. A ratio of the resistance of the reference resistor 120 and the dark resistance $R_{ref}/R_{dark}$ may be $0.01 \leq R_{ref}/R_{dark} \leq 10$. Preferably, the ratio $R_{ref}/R_{dark}$ may be around 0.1. The dark resistance of the photoconductor may be $50\Omega \leq R_{dark} \leq 500$ M$\Omega$. For example, the dark resistance of the array of photoconductors 112 may be 10 M$\Omega$. The reference resistor 120 may be adjustable. The resistance value of the reference resistor 120 may be manually and/or automatically adjustable. In particular, the reference resistor 120 may be adjustable with respect to the voltage input signal and photoconductor characteristics, for example a noise index.

The reference resistor 120 may be a dark photoconductor 122. The photoconductor 112 and the dark photoconductor 122 may be designed identical or different from each other. Specifically, the dark photoconductor 122 may be a dark PbS-sensor. For example, the reference resistor 120 may comprise a photoconductor covered with at least one opaque mask, wherein the opaque mask prevents that light can pass to the light-sensitive region of the covered photoconductor. As outlined above, the device 110 may comprise a plurality of photoconductors 112 arranged in an array. For each illuminated pixel a dark pixel may be employed as reference resistor 120. To adjust, in particular to optimize, the dark resistance the size of the dark pixel may be adapted. For example, in a manufacturing process, all pixels may be coated with the same material, therefore, changing the pixel size may be the easiest way to adapt the pixel resistance.

The photoconductor readout circuit 116 may comprises at least one bias voltage source 124 configured for applying at least one bias voltage $U_{bias}$ to the photoconductor 112. In FIG. 1 a voltage at a common collector Vcc is exemplary shown. The photoconductor 112 may be electrically connected with the bias voltage source 124. The bias voltage may be the voltage applied across the photoconductor material. The bias voltage may be a direct current (DC) voltage. The bias voltage $U_{bias}$ is $0.001 \text{ V} \geq U_{bias} \leq 5000$ V, preferably $1 \text{ V} \geq U_{bias} \leq 500$ V, most preferably $2 \text{ V} \geq U_{bias} \leq 50$ V. The photoconductor 112 may be electrically connected with the reference resistor 120, as outlined above, arranged in series. The reference resistor 120 may be grounded. When the photoconductor 112 is illuminated the photoconductor 112 may exhibit a decrease in electrical resistance. The current having passed the photoconductor 112 may pass through the reference resistor 120 which may generate the output signal Va which depends on the electrical resistance $R_{photo}$ of the photoconductor 112. The use of the dark photoconductor 122 may allow eliminating the strong dependency of the output signal on the photoconductors 112 dark resistance. Moreover, the use of the dark photoconductor 122 may incorporate a temperature compensation concerning temperature dependence of the photoconductor 112. However, the voltage Va of the still is composed by more than 99% out of $U_{bias}/2$ such that the signal of interest, introduced by the illumination of the light-sensitive region of the photoconductor 112 is less than 1%.

The photoconductor readout circuit 116 comprises the at least one capacitor 126, denoted as capacitor $C_b$ in the following. The capacitor 126 may have a capacity from 0.05 to 500 nF. Capacity of the capacitor $C_b$ may be, for example, 10 nF. The capacitor $C_b$ is arranged between the input of the amplifier device and an output of the voltage divider circuit. The capacitor 126 may be a filtering capacitor. The capacitor $C_b$ may be configured for blocking a dark current of the photoconductor 112. Specifically, the capacitor $C_b$ may be configured for filtering a dark DC current out of the output signal of the voltage divider circuit. The capacitor $C_b$ is configured for filtering for an alternating current (AC) signal component of the at least one output signal of the voltage divider circuit 118. The capacitor 126 may be configured for letting the AC signal component pass. The AC signal component may have no direct current (DC) component. The AC signal component may consist only of the signal of interest. In known photoconductor readout circuits, capacitors are used differently as proposed in the present invention. E.g. in a known voltage amplifier the capacitor is used as RC-high pass filter to remove the DC content and to amplify the AC content. Moreover, the filter requires further components such as CHP and RHP. For example, non-inverting amplifier circuit that is generally used in known circuits, includes at least one photoconductor, one reference resistor, one filter capacitor and one filter resistor. In contrast, the present invention uses the capacitor $C_b$ as high pass filter, but in addition the AC current is provided to at least one amplifier device. The charge amplifier and transimpedance amplifier according to the present invention have one less resistor in comparison. The photoconductor 112, reference resistor 120 and capacitor 126 form the filter such that less components are required. In addition, the generally used non-inverting amplifier has two resistors for the amplification in the non-inverting input. The charge amplifier and the transimpedance amplifier according to the present invention only has one component. Thus, the charge amplifier and the transimpedance amplifier according to the present invention have less components in comparison to prior art. Moreover, since often arrays of photoconductors are used with potentially hundreds of sensors, the reduction of components is very advantageous.

Figure 2:
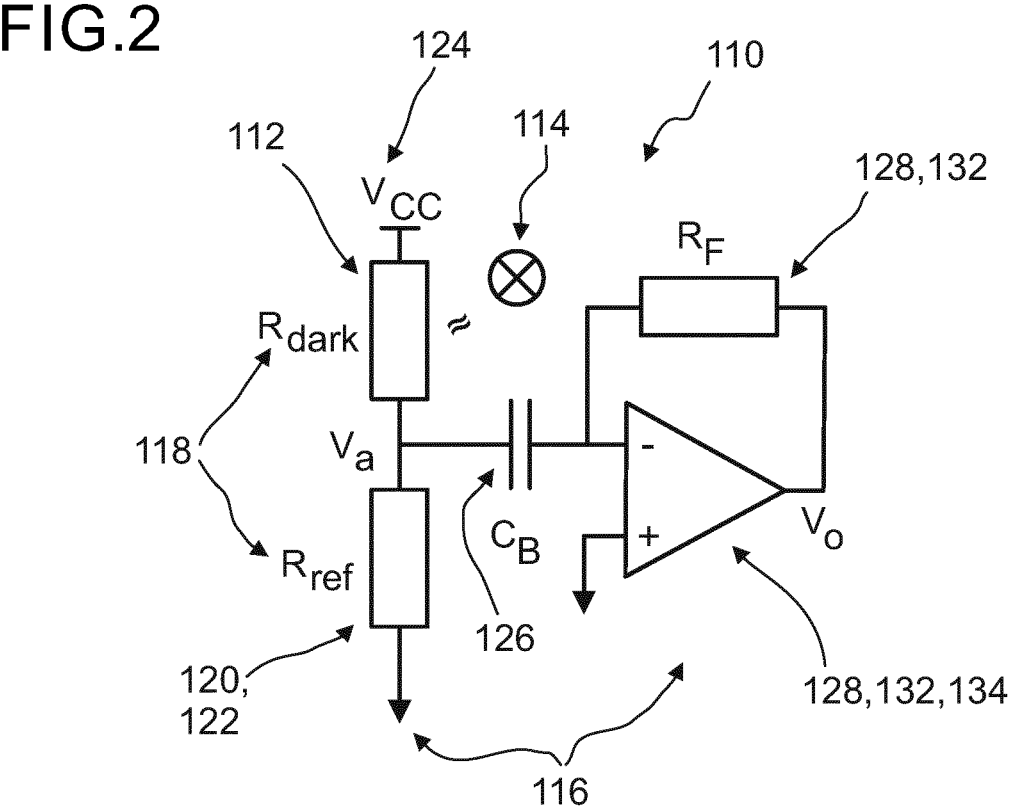

The photoconductor readout circuit 116 comprises at least one amplifier device 128. The amplifier device 128 may be configured for amplifying at least one output signal of voltage divider circuit 118, in particular the AC signal component having passed the capacitor 126. The amplifier device 128 may be at least one charge amplifier 130, as shown in FIG. 1, or at least one transimpedance amplifier 132. As shown in FIG. 2. The charge amplifier 130 may be an electronic device configured as integrator with high input impedances. The charge amplifier 130 may be configured to convert charge into voltage. The high input impedances may prevent leakage loss. The charge amplifier may comprise an operational amplifier 134. The charge amplifier 130 may comprise at least one capacitor $C_F$ in a feedback path. The capacitor $C_F$ in the feedback path may be configured for accumulating current over time. The transimpedance amplifier 132 may be an electronic device comprising the at least one operational amplifier 134 and a resistor $R_F$ in the feedback path. The transimpedance amplifier 132 may be configured for multiplying an input current with the resistance $R_F$. The transimpedance amplifier 132 may be configured for increasing the input and for converting the input current into voltage.

Charge amplifiers 130 and transimpedance amplifiers 132 are well known circuits used to measure charge and current. A direct connection of the photoconductor 112 to the charge amplifier 130 or transimpedance amplifier 132 is not feasible due to large dark current of the photoconductor 112. The amplifiers dynamic range would be severely limited due to the small ratio of output current of the photoconductor to dark current. As a result, these circuits have not been explored for the use with photoconductors. The photoconductor readout circuit 116 according to the present invention allows that charge amplifiers 130 and transimpedance amplifiers 132 can be used with sensors, in particular photoconductors 112, that exhibit large dark currents. The capacitor 126, as outlined above, may be placed between the amplifiers input and the voltage divider output. The capacitor 126 may serve to block the dark current and shunt the small output current of the photoconductor 112 to the amplifier device 128.

Without wishing to be bound by theory, an output voltage $v_o$ of the charge amplifier 130 or transimpedance amplifier 132 may be determined as follows. With the capacitor 126, the charge amplifier 130 and the transimpedance amplifier 132 may be regarded as voltage devices and a Fourier steady state is assumed. A transfer function of the charge amplifier may be $$\left|\frac{\Delta v_o}{v_a}\right| = \tau\omega\frac{C_b}{C_F},$$

wherein $v_a$ is an input voltage of the charge amplifier 130, $\tau$ is the integration time of the charge amplifier 130 and $\omega$ is the modulation frequency of the illumination. Similarly, the relationship between the output voltage $v_o$ of the transimpedance amplifier 132 and the input voltage $v_a$ of the transimpedance amplifier 132 can be determined by $$\left|\frac{\Delta v_o}{v_a}\right| = \omega\frac{C_b}{R_F}.$$

Figure 3:
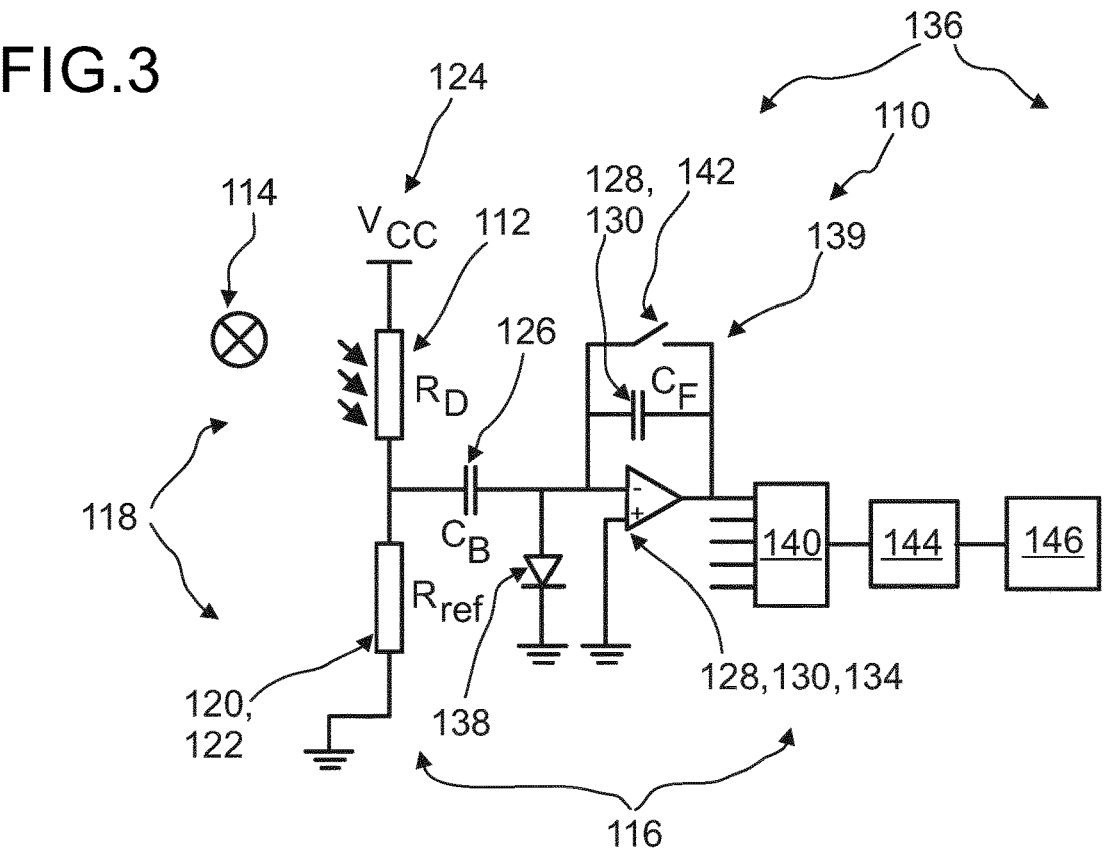

FIG. 3 shows an embodiment of a resistive transducer 136 comprising at least one device 110 according to the present invention, as described with respect to FIGS. 1 and 2. In addition, to the embodiments shown in FIGS. 1 and 2, the photoconductor readout circuit 116 may comprise at least one diode 138 arranged between the capacitor $C_B$ and the amplifier device 128. The diode 138 may be configured as a protective diode that protects amplification from voltage peaks. A cathode of the diode 138 may be connected to ground and an anode with the capacitor $C_B$. The diode 138 may be configured for conducting current to ground and to protect current flow in the other direction. The use of a diode 138 may significantly accelerate the transient oscillation time at start up. The diode 138 may be or may comprise a TVS diode. The diode 138 may be configured for suppressing transient voltages. The diode 138 may be designed such that it does not functionally impact the circuit. The diode 138 may be used to protect the circuit from damage in the event of a transient voltage. The protection diode, such as a TVS ESD diode, is generally either a part of the read-out integrated circuit or a separate diode included for extra protection. Other mechanisms to protect the input are possible.

As outlined above, the device 110 may comprise a plurality of photoconductors 112 such as arranged in an array. The photoconductor readout circuit 116 may be configured for determining electrical resistance of each photoconductor 112 of the plurality of photoconductors 112. The device 110 may comprise at least one sample and hold circuit 139 and at least one multiplexer 140. The sample and hold circuit 139 may be configured for sampling voltage and for holding the value of the voltage at a constant level for a certain time period. The sample and hold circuit 139 may comprise at least one capacitor configured for storing electric charge. The sample and hold circuit 139 may comprise a switch 142 in parallel to the amplifier device 128 in order to discharge the circuit. If the switch 142 is closed, the capacitor may be charged over the amplifier device 128. When opening the switch 142, the capacitor may hold the voltage at a constant value which was present before opening of the switch. In principle it may be possible to perform the discharge via a resistor in parallel to the protective diode. However, the discharge via the sample and hold circuit may be much faster than through a resistor.

The device 110 may further comprise at least one analog-to-digital converter (ADC) 144 configured to converts an output signal of the photoconductor readout circuit 116 into a digital signal, specifically for further evaluation. In case of the device 110 comprises a plurality of photoconductors 112 and corresponding reference resistors 120, the device 110 may comprise for each pair of photoconductors 112 and corresponding reference resistors 120 at least one ADC 144. However, other arrangements are feasible.

The resistive transducer 136 furthermore comprises at least one evaluation device 146 adapted to determine a voltage output signal at at least one voltage output of the photoconductor readout circuit 116. The evaluation device 146 may be or may comprise one or more integrated circuits, such as one or more application-specific integrated circuits (ASICs), and/or one or more data processing devices, such as one or more computers, preferably one or more microcomputers and/or microcontrollers. Additional components may be comprised, such as one or more preprocessing devices and/or data acquisition devices, such as one or more devices for receiving and/or preprocessing of the voltage signal, such as one or more AD-converters and/or one or more filters. Further, the evaluation device 146 may comprise one or more data storage devices. Further, as outlined above, the evaluation device 146 may comprise one or more interfaces, such as one or more wireless interfaces and/or one or more wire-bound interfaces. The evaluation device 146 may particularly comprise at least one data processing device, in particular an electronic data processing device, which can be designed to determine at least one output voltage signal. The evaluation device 146 can also be designed to completely or partly control the at least one illumination source and/or to control the at least one voltage source and/or to adjust the at least one load resistor. The evaluation device 146 may further comprise one or more additional components, such as one or more electronic hardware components and/or one or more software components, such as one or more measurement units and/or one or more evaluation units and/or one or more controlling units.

Figure 4:
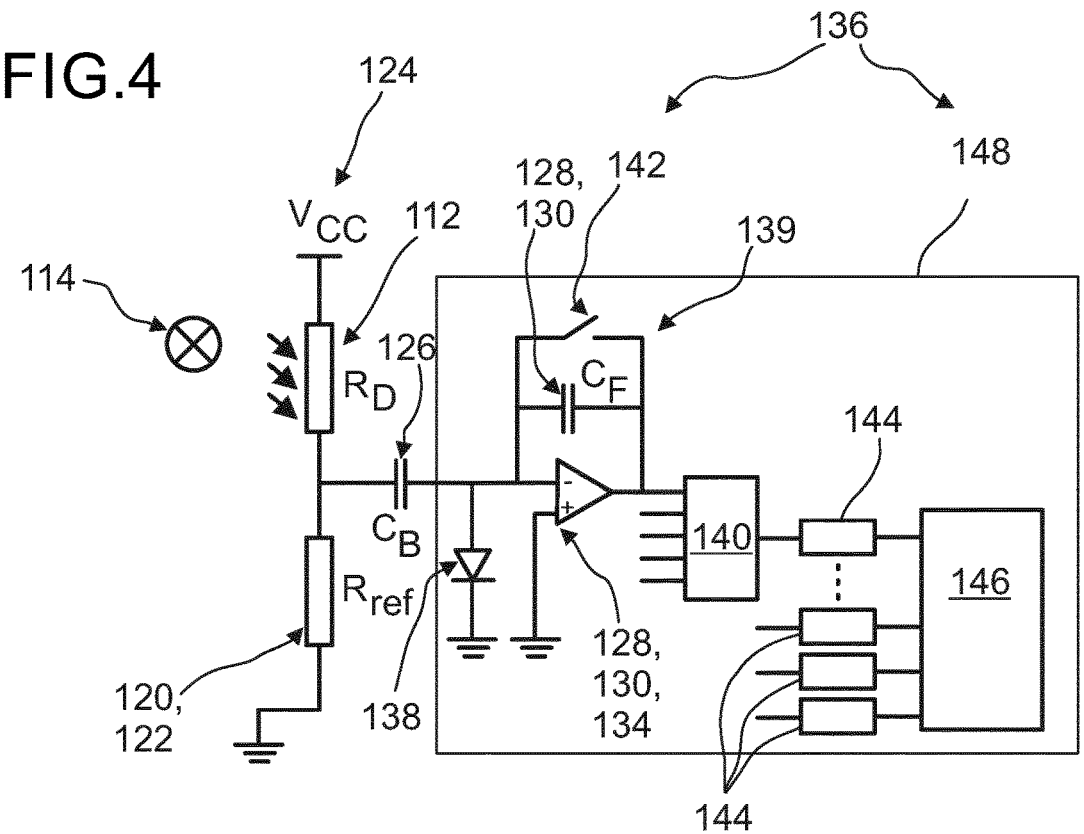

As shown in FIG. 4, the device 110 may comprise at least one read-out integrated circuit (ROIC) 148. The reference resistor $R_{ref}$ and the capacitor $C_B$ may not form part of the ROIC 148 due to space constraints. In particular, large capacitors and resistors require a large area in the integrated circuit and may be prohibitively expensive. The ROIC 148 may comprise specific technology blocks like the ADC, multiplexer, sample and hold circuit. The ROIC 148 may comprise means for the dark signal cancellation, in particular filtering, and an amplification stage as well as means to access the output signal of each input. The photoconductor readout circuit 116 may be designed as at least one integrated circuit. The integrated circuit may comprise the amplifier device 128 and/or the sample and hold circuit 139 and/or the multiplexer 140. The integrated circuit may furthermore comprise the diode 138. The integrated circuit may furthermore comprise the at least one ADC. For example, the integrated circuit may be embodied as a microchip.

Figure 5A:
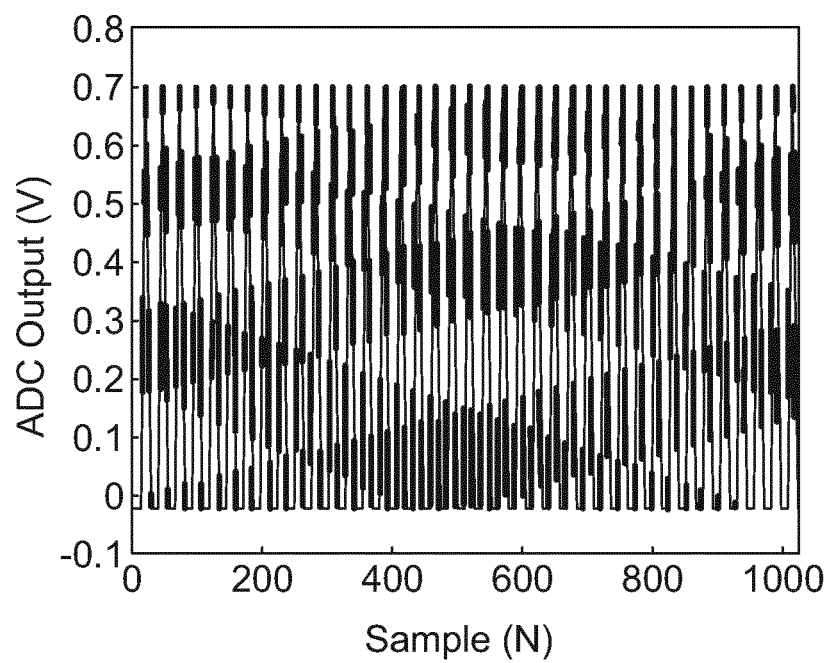
Figure 5B:
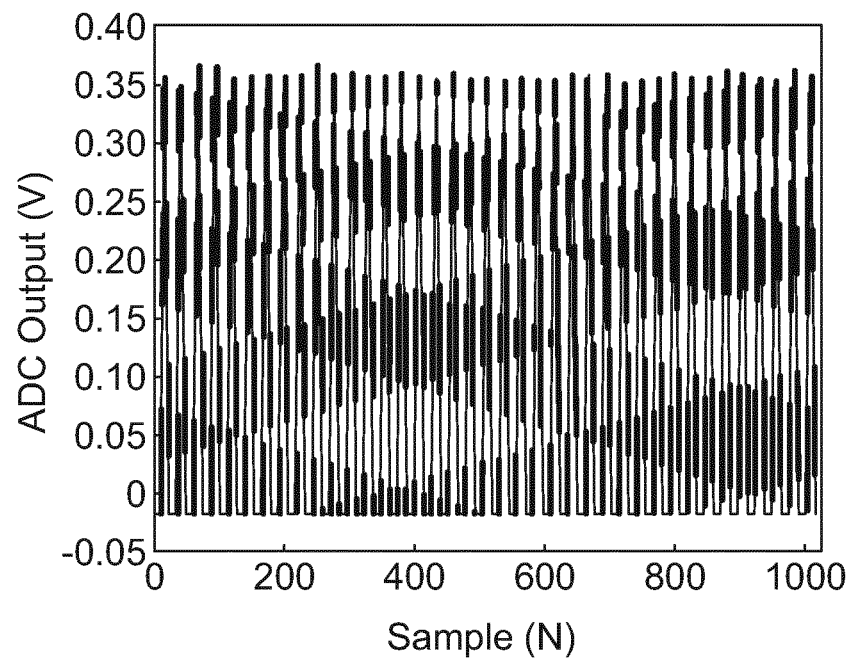

FIGS. 5A and 5B show experimental results of amplified output voltages, denoted ADC output in V, in response to a modulated electromagnetic signal of known intensity as a function of sample N, wherein N is a sample number from the ADC. A set number of samples N was read from the ADC at fixed time intervals between each sample. For the experimental setup, a light source with a power density of $P_d$=10.1 μW/cm² was used. The photoconductor readout circuit 116 comprising the charge amplifier 130 has been tested with several commercially available integrated circuits (ICs) under various conditions. Various capacitors $C_B$, reference resistors $R_{ref}$, integration times T and feedback capacitors $C_F$ have been tested to find the optimal signal to noise ratio and dynamic signal response of the system. FIG. 5A shows experimental results for $C_B$=3.3 nF, $R_{ref}$=1.2 MΩ and $C_F$=3.0 pF. FIG. 5B shows experimental results for $C_B$=3.3 nF, $R_{ref}$=2.4 MΩ and $C_F$=3.0 pF. For both Figures, the modulated electromagnetic signal has a frequency of 60 Hz, the integration time r was 640 μs.

Figure 6:
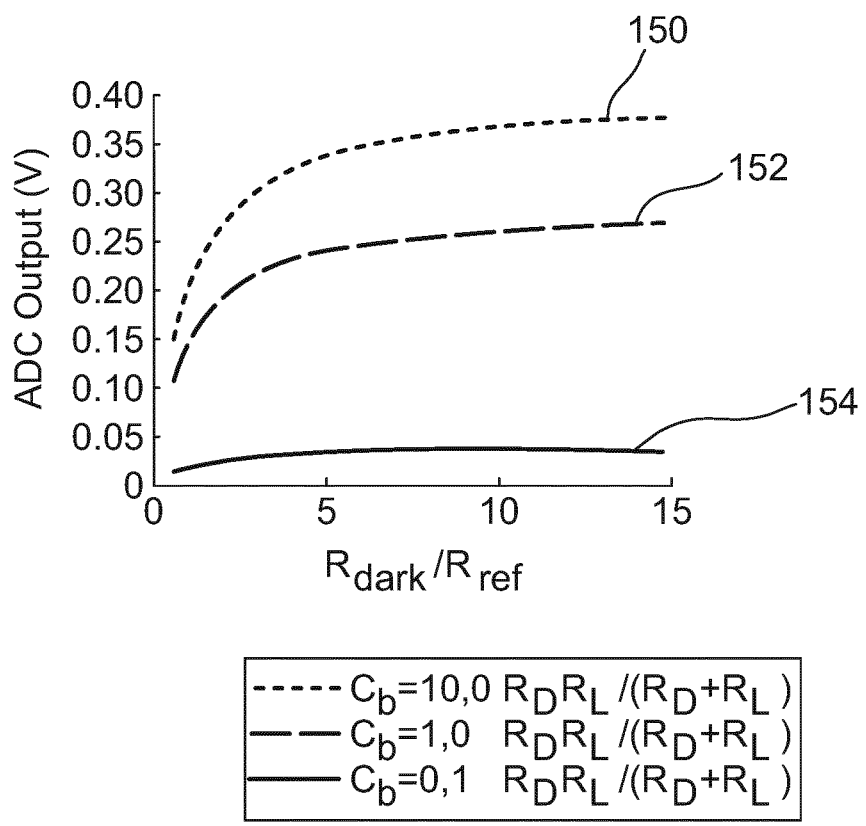

FIG. 6 shows experimental results of output voltage response of an ROIC, denoted ADC output in V, to an photoconductor array according to the present invention based on varying $C_B$ and $R_{ref}$ values. The ADC output as a function of $R_{dark}/R_{ref}$ was plotted. In particular, a PbS-Array of 380 μm×38 μm was used, having a dark resistance of 15 MΩ. For the experimental setup, a light source with a power density of $P_d$=20 ρW/cm² was used. For both FIG. 6, the modulated electromagnetic signal has a frequency of 16 Hz, the integration time T was 1000 μs. The bias voltage was 10 V and $C_F$ was 25.0 pF. Curve 150 shows the ADC output for $C_B$=(10.0 $R_{dark}R_{ref}$)/($R_{dark}$+$R_{ref}$). Curve 152 shows the ADC output for $C_B$=(1.0 $R_{dark}R_{ref}$)/($R_{dark}$+$R_{ref}$). Curve 154 shows the ADC output for $C_B$=(0.1 $R_{dark}R_{ref}$)/($R_{dark}$+$R_{ref}$).

LIST OF REFERENCE NUMBERS 110 device
112 photoconductor
114 illumination source
116 photoconductor readout circuit
118 voltage divider circuit
120 reference resistor
122 dark reference resistor
124 bias voltage source
126 capacitor
128 amplifier device
130 charge amplifier
132 transimpedance amplifier
134 operational amplifier
136 resistive transducer
138 diode
139 sample and hold circuit
140 multiplexer 142 switch
144 analog-to-digital converter
146 evaluation device
148 read-out integrated circuit
150 curve
152 curve
154 curve

The invention claimed is:

1. A device comprising
at least one photoconductor configured for exhibiting an electrical resistance dependent on an illumination of a light-sensitive region of the photoconductor; and
at least one photoconductor readout circuit, wherein the photoconductor readout circuit comprises at least one voltage divider circuit, wherein the voltage divider circuit comprises at least one reference resistor $R_{ref}$ arranged in series with the photoconductor, wherein the reference resistor is a dark photoconductor, wherein the photoconductor readout circuit further comprises at least one amplifier device, and wherein the photoconductor readout circuit further comprises at least one capacitor arranged between an input of the amplifier device and an output of the voltage divider circuit.

2. The device according to claim 1, wherein the amplifier device is at least one charge amplifier or at least one transimpedance amplifier.

3. The device according to claim 1, wherein the amplifier device is configured for amplifying at least one output signal of voltage divider circuit.

4. The device according to claim 1, wherein the capacitor is configured for blocking a dark current of the photoconductor, and wherein the capacitor is configured for filtering a dark DC current out of at least one output signal of the voltage divider circuit.

5. The device according to claim 1, wherein the photoconductor has a dark resistance $R_{dark}$, and wherein a ratio of the resistance of the reference resistor and the dark resistance $R_{ref}/R_{dark}$ is $0.01 \leq R_{ref}/R_{dark} \leq 10$.

6. The device according to claim 1, wherein the photoconductor readout circuit further comprises at least one diode arranged between the capacitor and the amplifier device.

7. The device according to claim 1, wherein the device further comprises at least one read-out integrated circuit.

8. The device according to claim 1, wherein the photoconductor readout circuit further comprises at least one bias voltage source configured for applying at least one bias voltage to the photoconductor.

9. The device according to claim 8, wherein the bias voltage $U_{bias}$ is $0.001 \text{ V} \geq U_{bias} \leq 5000 \text{ V}$.

10. The device according to claim 8, wherein the bias voltage $U_{bias}$ is $1 \text{ V} \geq U_{bias} \leq 500 \text{ V}$.

11. The device according to claim 8, wherein the bias voltage $U_{bias}$ is $2 \text{ V} \geq U_{bias} \leq 50 \text{ V}$.

12. The device according to claim 1, wherein the device further comprises a plurality of photoconductors, and wherein the photoconductors are arranged in an array.

13. The device according to claim 12, wherein the photoconductor readout circuit is configured for determining electrical resistance of each photoconductor of the plurality of photoconductors, and wherein the device further comprises at least one sample and hold circuit and at least one multiplexer.

14. The device according to claim 1, wherein the light-sensitive region comprises at least one photoconductive material selected from the group consisting of lead sulfide (PbS); lead selenide (PbSe); mercury cadmium telluride (HgCdTe); cadmium sulfide (CdS); cadmium selenide (CdSe); indium antimonide (InSb); indium arsenide (InAs); indium gallium arsenide (InGaAs); extrinsic semiconductors; and organic semiconductors.

15. A resistive transducer comprising at least one device according to claim 1, wherein the resistive transducer further comprises at least one evaluation device configured for determining an output signal at at least one voltage output of the photoconductor readout circuit.

16. A method of using the device according to claim 1, the method comprising using the device for readout of one or more of at least one PbS sensor, at least one PbSe sensor, or at least one pixelated sensor array comprising a plurality of pixels, wherein each of the pixels comprises at least one PbS or PbSe sensor.

* * * * *